United States Patent [19]

Rambin

[11] Patent Number: 5,279,036
[45] Date of Patent: Jan. 18, 1994

[54] SPOON OR SPATULA FOR FOOD USE

[75] Inventor: Christian Rambin, Pélussin-Maclas, France

[73] Assignee: S.A. Gad, France

[21] Appl. No.: 3,824

[22] Filed: Jan. 8, 1993

Related U.S. Application Data

[63] Continuation of Ser. No. 543,718 filed as PCT/FR88/00606, Dec. 13, 1988

[30] Foreign Application Priority Data

Dec. 17, 1987 [FR] France ................................ 87 17967
Apr. 19, 1988 [FR] France ................................ 88 05270

[51] Int. Cl.⁵ .............................................. A47G 21/04
[52] U.S. Cl. ............................................ 30/324; 30/137
[58] Field of Search ................ 30/114, 124, 137, 322-; 294/49, 55, 99.1; 81/64, 176.3, 3.4, 487

[56] References Cited

U.S. PATENT DOCUMENTS

| | | | |
|---|---|---|---|
| 2,080,947 | 5/1937 | Ligeour | 294/99.1 X |
| 2,571,465 | 10/1951 | McDevitt | 30/114 |
| 2,801,823 | 8/1957 | Faughnder | 30/322 X |
| 2,853,779 | 9/1958 | Londo | 30/322 X |
| 3,609,865 | 10/1971 | Golden | 30/322 |

Primary Examiner—Douglas D. Watts
Attorney, Agent, or Firm—Sughrue, Mion, Zinn, Macpeak & Seas

[57] ABSTRACT

The invention is related to a spoon for food use. A spoon (1) has a handle (5) and an end (8) provided with a cavity (2) used to house the food product, pinchers (3,12) are provided to ensure the holding of the product inside its cavity (2). The invention acts more particularly to hold lump sugar.

9 Claims, 2 Drawing Sheets

SPOON OR SPATULA FOR FOOD USE

This is a continuation of application Ser. No. 07/543,718 filed as PCT/FR88/00606, Dec. 13, 1988 now abandoned.

The present invention relates to a spoon for food use.

Spoons are utensils used in a wide variety of applications to serve, stir or eat different foods. For example, spoons are used to ensure the mixing of sugar in a cup of coffee, homogenization of syrups in a glass or for eating certain foods, such as soup.

More particularly, in the fast food field, more and more use is being made of utensils such as forks, knives or spoons made of synthetic material and intended for a one-time use. Thus, a certain number of food products are now packed in individual portions in disposable packages. One example is sugar, intended to be used either in coffee or another drink, or in other foodstuffs such as yogurts or cream cheeses, and packaged in packets, with the sugar being in powder or cubed form.

However, such packaging requires a supply both of utensils for stirring and of measured quantities of product. In addition, when such measured quantities of product, such as sugar, are left at the disposal of consumers, on a bar for example, they frequently become deteriorated and, thus, unfit for consumption.

Furthermore, it should be noted that the cost of this type of product packaged in measured quantities is high.

To partially overcome these disadvantages, there is known from the prior art French Patent Application No. 2,158,298 describing a spoon or spatula for food use comprising a handle and an end provided with a cavity used for housing a food product, as well as British Patent No. 1,012,636 and French Patent No. 87 15250, describing a spoon in which at least the concave part is closed by heat sealing using a pastil provided with a tear-off tab extending beyond the spoon.

Thus, this type of spoon can house powdered sugar or other food products, such as jam, syrup, etc.

However, this type of spoon for food use is not economic to produce and has manufacturing constraints since the food product must be incorporated therein before closing its concave part by means of a pastil.

The purpose of this invention is therefore to remedy the above-mentioned disadvantages and it refers to a spoon designed to house a food product, wherein the food is held by pinching, and said spoon or spatula being able to be used as a stirrer as well.

To this purpose, the spoon of the invention is formed of a spatula comprising a handle and an end provided with a cavity serving to house a foodstuff, with pinching means being provided to ensure that the food is kept inside said cavity.

This construction according to the invention is particularly interesting economically since the container is the spoon itself, which cuts down packing and transport charges as well as the number of items to be ordered by the restaurant operator. It permits a perfect dosing of food and eliminates the risk of the deterioration of products left at consumers' disposal. Advantageously, the spoon of the invention utilizes a mere pinching system, and said spoon or spatula and the food being packaged in a protective cover.

Generally, the spoon of the invention is constructed in order to have enough rigidity to hold the food product, while the elasticity of the synthetic material used for the construction of such a spoon also permits to release said food product before its use.

More precisely, according to this invention, the spoon is in form of a hollow handle having a certain degree of rigidity while the cavity designed to hold the food product is also provided with stiffening means. The rigidity is necessary both to hold the food product and for the spoon or spatula to be used as a stirring apparatus. However the stiffness of the handle and of the cavity used to keep the food product is just adequate so that said spoon or spatula retain a certain degree of flexibility to permit the release of said food product.

If however lump sugar is used, an opening operation in order to release said food product is not necessary since it is sufficient to immerse the spatula also serving as agitator, into coffee for instance and the lump of sugar is dissolved.

In a first mode of embodiment of the spoon of the invention, said cavity is in form of a flat bottom provided with two transversal edges forming said pinching means in order to keep said food product inside said cavity.

In another mode of embodiment of the spoon of the invention, said cavity is in form of an elastic slot constituting the pinching means of said food product.

Other advantages and embodiments of this invention will appear from the following description with reference to appended drawings.

Figure 1:
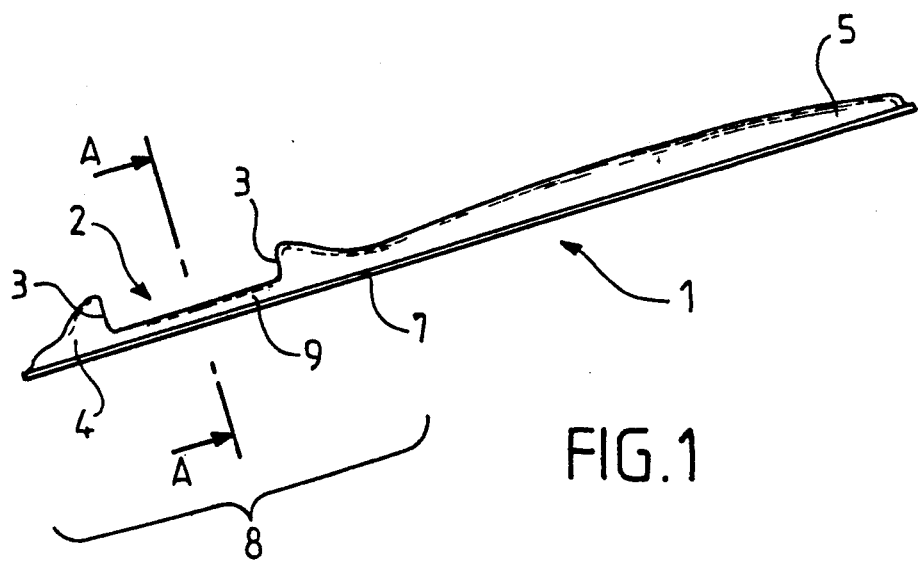
FIG. 1 is a perspective view of the spoon of the invention.

According to the invention as illustrated (FIGS. 1 and 2) the spoon for eating use consists of a spatula 1 having a handle 5 and an end 8 provided with a cavity 2 to house a food product i.e. an article of food such as a lump of sugar. Pinching means 3, 12, are provided in order to keep the product inside said cavity 2.

Said spoon of the invention is obtained by thermoforming a synthetic material in order to provide a hollow handle 5, the whole of the thermoformed plate having stiffening means 22 in order to obtain a relatively rigid and light spoon 1

Figure 3:
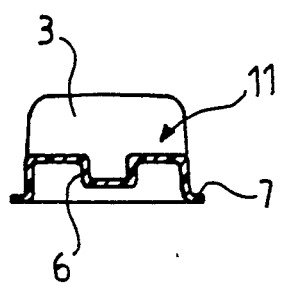
FIG. 3 is a section view along the line A—A of FIG. 1

More precisely, said spoon 1 comprises stiffening means 11 made on the one hand by a flat edge 7 surrounding the external circumference of said spoon 1 (FIG. 3) and on the other hand by a reinforcing groove 6 longitudinally centered along the bottom or base 9 of said cavity 2.

Figure 2:
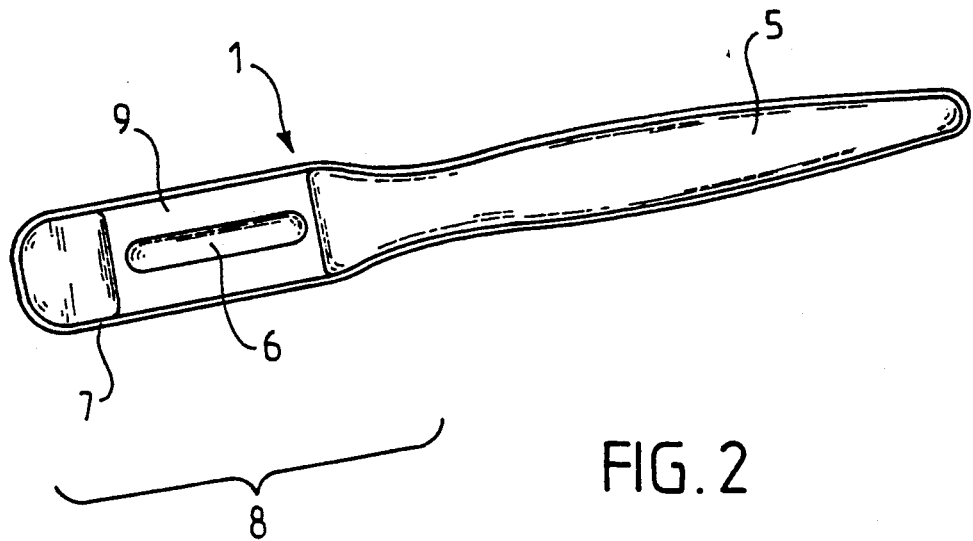
FIG. 2 is an underside view of the spoon of the invention.

However and despite the stiffening means 11, elasticity of said synthetic material used to make said spoon or spatula 1 is also required to hold the food product between said pinching means 2, 12, and to release said product through a slight pressure applied to the opening means 4 of said spoon 1 as illustrated in FIG. 1.

In a preferred mode of embodiment of the invention as illustrated in FIG. 1, said cavity 2 is in form of a flat bottom 9 provided with two transversal edges 3 forming said pinching means 3, 12 of said spoon 1.

However said two transversal edges 3 of said cavity 2 can be constructed in different ways.

Figure 4:
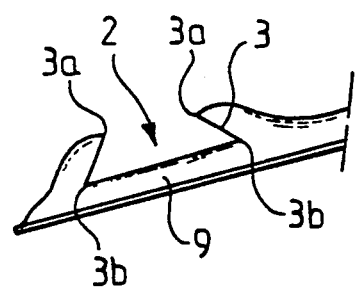
FIG. 4 is a detailed view of a first embodiment of the pinching means according to the invention.

In fact, in a first embodiment of the invention as illustrated in FIG. 4, both transversal edges 3 of said cavity 2 are each acute-angled with the flat bottom 9 of said cavity 2 and in the inward direction. The spacing between both upper edges 3a is smaller than the spacing between both lower edges 3b of both transversal edges 3 in order to ensure the pinching of said food product.

Figure 5:
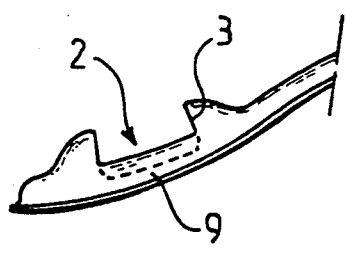
FIG. 5 is a detailed view of a second embodiment thereof
Figure 6:
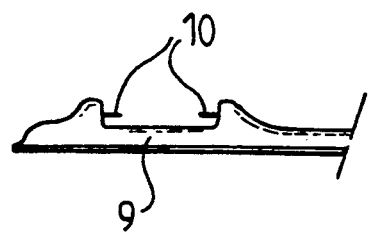
FIG. 6 is a detailed view of a third embodiment of the pinching means according to the invention.

In a further embodiment of the invention as illustrated in FIG. 5, both transversal edges 3 are at right angles to the bottom 9 of said cavity 2, while pinching is obtained by a cambering toward the top of said spoon 1 along said end 8, so that the latter has a upwardly concave curve, the shape of which is equivalent to the curve of a spoon for normal use. In this case again, the elasticity of the synthetic material is used to permit the forming of this cambering and therefore to achieve the holding of the food product.

Lastly, in a third embodiment illustrated in FIG. 5, consideration is given to the possibility for each transversal edges 3 or cavity 2 to be provided with a dog point 10 that serves as an anchoring point for said food product to be housed in said cavity 2.

In this third form of embodiment according FIG. 5, the food product used must have a hardness less than that of said dog points 10 in order not to break them.

Figure 7:
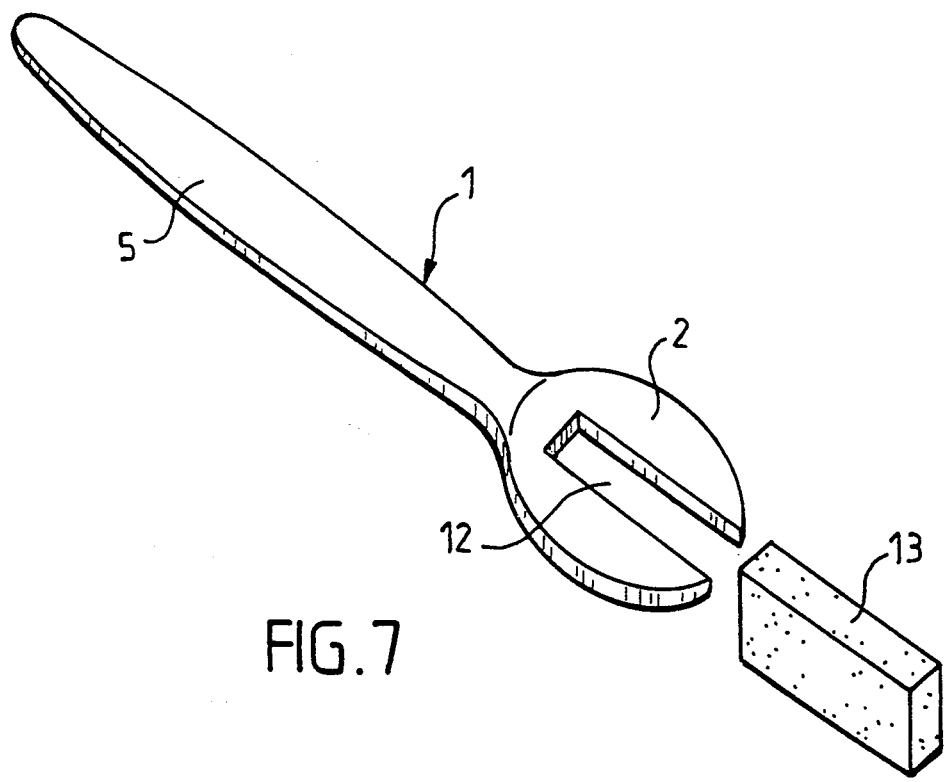
FIG. 7 is a perspective view of a spoon forms a second embodiment of the invention.

Furthermore, in a second embodiment of the invention as illustrated in FIG. 7, said cavity 2 is in form of an elastic slot 12 serving as said pinching means 3, 12 to hold said food product 13 in the slot.

More generally the invention as described in the aforegoing greatly improves the existing technique by providing a spoon of simple design that acts as a container for some food products designed to be stirred or eaten by means of said spoon that represents a very cheap and hygienic approach.

Moreover all the forms of invention as described above are suitable to hold a lump of sugar or other other food products such as sweetening. To this purpose, sweetening being smaller than a lump of sugar, the spacing between said pinching means 3, 12 is then made appropriate to the food product intended to be housed in said cavity 2.

The invention is of course not restricted to the above described and illustrated forms of embodiment but other modification can be made without departing from the scope of the invention.

I claim:

1. An elongated, unitary elastic synthetic material implement for food use consisting of a handle and an integral opposite end, a cavity within said end for elastically receiving an article of food;
   gripping means provided in said end to ensure that said article of food is elastically held in said cavity;
   a base within said end;
   said cavity being provided within said base, and said base having two transversal rims constituting longitudinally spaced parallel transversal edges partially defining said cavity and constituting said gripping means.

2. The implement for food use in accordance with claim 1, wherein said two transversal rims project at right angles from the base.

3. The implement for food use in accordance with claim 1, wherein said end is shaped concavely toward said cavity of the implement.

4. The implement for food use in accordance with claim 2, wherein said rims projecting at right angles from the base are each provided with a projection located in said cavity and acting as anchoring points for said food product held in said cavity.

5. An elongated spoon consisting of a handle and an integral end, said end being provided with a cavity intended to receive an article of food;
   gripping means being provided in said end to ensure that the article of food is held in said cavity;
   said cavity being defined partially by a base of said end portion;
   two transversal rims constituting said gripping means and provided on said base, each rim defining an acute angle with said base, and a first gap between said rims at a top of the cavity being less than a second gap between said rims at a bottom of said cavity.

6. The spoon in accordance with claim 5, wherein the end is longitudinally shaped concavely toward said cavity of the implement.

7. An elongated, unitary elastic synthetic material spoon consisting of a handle and an integral end, said end being provided with a cavity for receiving an article of food;
   gripping means for receiving the article of food;
   said gripping means being provided in said end to ensure that the article of food is held elastically in said cavity;
   said gripping means being constituted by an elongated slot within said end, delimited by two resilient side arms extending in spaced parallel position for resiliently embracing said article of food.

8. An elongated, unitary elastic synthetic material implement for food use comprising a handle and an integral end, said end having a flat base provided with a cavity for receiving an article of food;
   gripping means provided in said end for elastically gripping said article of food in said cavity;
   said flat base having two spaced parallel traversal rims integrally formed with said flat base and constituting said gripping means;
   said implement being a heat formed sheet of said elastic synthetic material with said handle being hollow;
   and wherein at least said end of said implement of a heat-formed sheet of synthetic material including stiffening means, whereby said implement is a relatively rigid, light implement.

9. The implement for food use in accordance with claim 8, wherein said stiffening means comprises a flat rim extending around the exterior periphery of said implement and a reinforcing groove centered longitudinally within a base of said end of said implement.

* * * * *